US012403065B2

(12) United States Patent
Williams

(10) Patent No.: US 12,403,065 B2
(45) Date of Patent: Sep. 2, 2025

(54) SEXUAL ROLLING MACHINE

(71) Applicant: Jack Dennis Williams, Columbia, SC (US)

(72) Inventor: Jack Dennis Williams, Columbia, SC (US)

( * ) Notice: Subject to any disclaimer, the term of this patent is extended or adjusted under 35 U.S.C. 154(b) by 996 days.

(21) Appl. No.: 17/499,785

(22) Filed: Oct. 12, 2021

(65) Prior Publication Data

US 2023/0116209 A1 Apr. 13, 2023

(51) Int. Cl.
*A61H 19/00* (2006.01)
*A61H 23/02* (2006.01)

(52) U.S. Cl.
CPC ............. *A61H 19/50* (2013.01); *A61H 19/40* (2013.01); *A61H 23/02* (2013.01); *A61H 23/0254* (2013.01); *A61H 2201/0107* (2013.01); *A61H 2201/0157* (2013.01); *A61H 2201/0161* (2013.01); *A61H 2201/1207* (2013.01); *A61H 2201/1215* (2013.01); *A61H 2201/1623* (2013.01); *A61H 2201/1633* (2013.01); *A61H 2201/1638* (2013.01); *A61H 2201/1642* (2013.01); *A61H 2201/1666* (2013.01); *A61H 2203/0431* (2013.01)

(58) Field of Classification Search
CPC ........ A61H 19/00; A61H 19/30; A61H 19/44; A61H 19/40; A61H 19/50
See application file for complete search history.

(56) References Cited

U.S. PATENT DOCUMENTS

| | | | | |
|---|---|---|---|---|
| 7,524,283 | B1 * | 4/2009 | Johnstone, II | A61H 19/50 600/38 |
| 9,649,248 | B2 * | 5/2017 | Lopez | A47C 15/008 |
| 11,071,683 | B2 * | 7/2021 | Ray | A61H 19/44 |

* cited by examiner

*Primary Examiner* — Carrie R Dorna

(57) ABSTRACT

The sexual rolling machine is a motorized sex machine that folds up for quick storage and includes a detachable seat with adjustable back rest and smooth surfaces for easy cleaning. The machine has protective covers around the edges and a concealed motor drive for safety. The motor has variable direction and speed control for customization to the user's preferences. The motor is attached to a toy arm that is adapted to accept a variety of sex toy attachments in order to enhance sex with or without a partner.

7 Claims, 4 Drawing Sheets

SEXUAL ROLLING MACHINE

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of erotic devices and more specifically relates to a motorized sex machine for use by both couples and singles that combines a comfortable surface with a unique rotating motion.

2. Description of the Related Art

A sex machine is a mechanical device used to simulate human sexual intercourse or other sexual activity. Devices can be penetrative or for external use. The term "fucking machine" is generally used to describe a penetrative machine that works by the transfer of rotational or reciprocating force from a motor to a directional motion on a shaft tipped by a dildo.

People respond differently to different sexual stimulations, so an erotic device that is enjoyable for one person may not be enjoyable for another. This, in addition to the basic human drive for novelty, creates an ever present need for a wide variety of erotic devices and sex machines that provide different forms of stimulation.

Various attempts have been made to solve the problems which may be found in the related art but have thus far been unsuccessful. A need exists for a reliable Sexual Rolling Machine to avoid the above-mentioned problems.

BRIEF SUMMARY OF THE INVENTION

In view of the foregoing disadvantages inherent in the known art, the present invention provides a novel Sexual Rolling Machine. The general purpose of the present invention, which will be described subsequently in greater detail, is to provide a motorized erotic device for both couples and singles that combines a comfortable, bouncy surface with a unique rotating motion.

The sexual rolling machine folds up for quick storage and includes a detachable seat with adjustable back rest and smooth surfaces for easy cleaning. The machine has protective covers around the edges and a concealed motor drive for safety. The motor has variable direction and speed control for customization to the user's preferences. The motor is attached to a toy arm that is adapted to accept a variety of sex toy attachments in order to enhance sex with or without a partner.

The presently claimed invention holds significant improvements and serves as a sexual rolling machine. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention that are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, Sexual Rolling Machine, constructed and operative according to the teachings of the present invention.

The various embodiments of the present invention will hereinafter be described in conjunction with the appended drawings.

DETAILED DESCRIPTION

As discussed above, embodiments of the present invention relate to a sex machine and more particularly to a Sexual Rolling Machine. The Sexual Rolling Machine is a motorized erotic device for both couples and singles that combines a comfortable, bouncy surface with a unique rotating motion.

Figure 1:
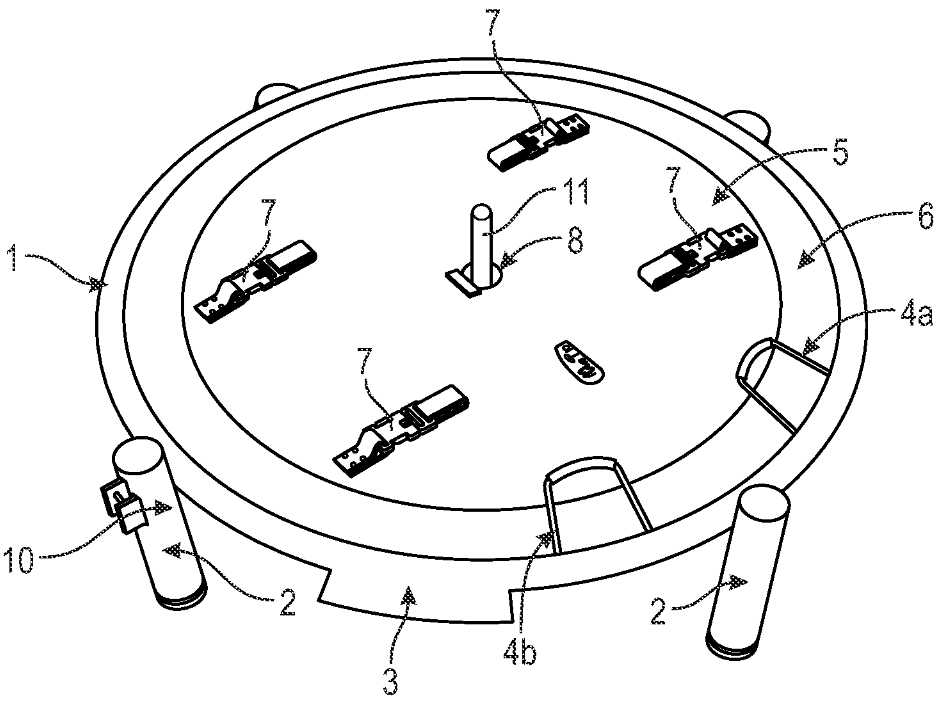
FIG. 1 shows a perspective view illustrating a sexual rolling machine, according to an embodiment of the presently claimed invention.
Figure 2:
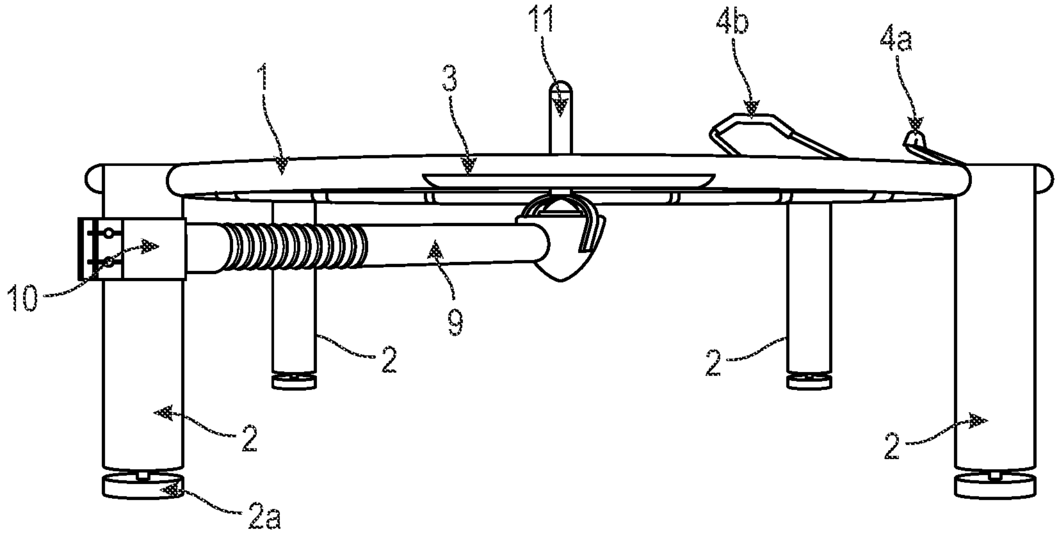
FIG. 2 shows a perspective view illustrating a sexual rolling machine, according to an embodiment of the presently claimed invention.

Referring now to the drawings FIGS. 1-2, the sexual rolling machine has a frame 1 supported off the ground by four legs 2. Each leg 2 is attached to the frame 1 via an internal hinge so that each leg 2 is foldable inwards and underneath the frame 1. Each leg 2 also has an adjustable foot 2*a* so that the frame 1 is firmly supported even on uneven surfaces. The frame 1 has an integral handle 3 for ease in moving and carrying the machine. The machine includes a left foot stirrup 4*a* and a right foot stirrup 4*b* connected to the frame 1. The frame 1 supports a comfortable, stretchy main surface 5 formed of an easily cleanable fabric or similar material. There is a connection cover 6 that covers the connections between the main surface 5 and the frame 1 for the user's safety. The main surface 5 includes one or more chair attachments 7 around a central opening 8.

Underneath the frame 1 and main surface 5, a toy support arm 9 attaches to one of the legs 2 via a removeable clamp 10. The toy support arm 9 extends horizontally underneath the main surface 5 to the central opening 8. A toy attachment part 11 extends vertically from the toy support arm 9 through the central opening 8 and above the main surface 5. A number of erotic devices can be attached to the toy attachment part 11 according to the user's personal preferences. A motor drive 12 is housed within the toy support arm 9 and powers the toy attachment part 11 to both revolve and vibrate.

Figure 3:
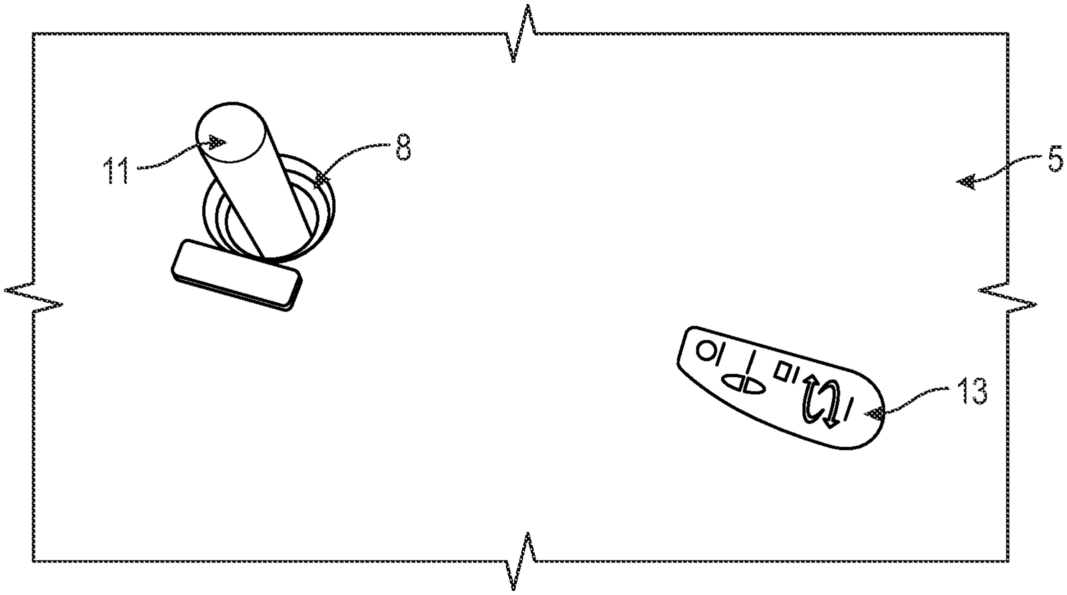
FIG. 3 shows a close view illustrating a toy arm connector and control panel of a sexual rolling machine, according to an embodiment of the presently claimed invention.

As shown in FIG. 3, a control device 13 is located on the main surface 5. The control device sends a signal to the motor drive 12 to turn the motor drive on and off, control the direction of revolution, and control the speed of vibration.

Figure 4:
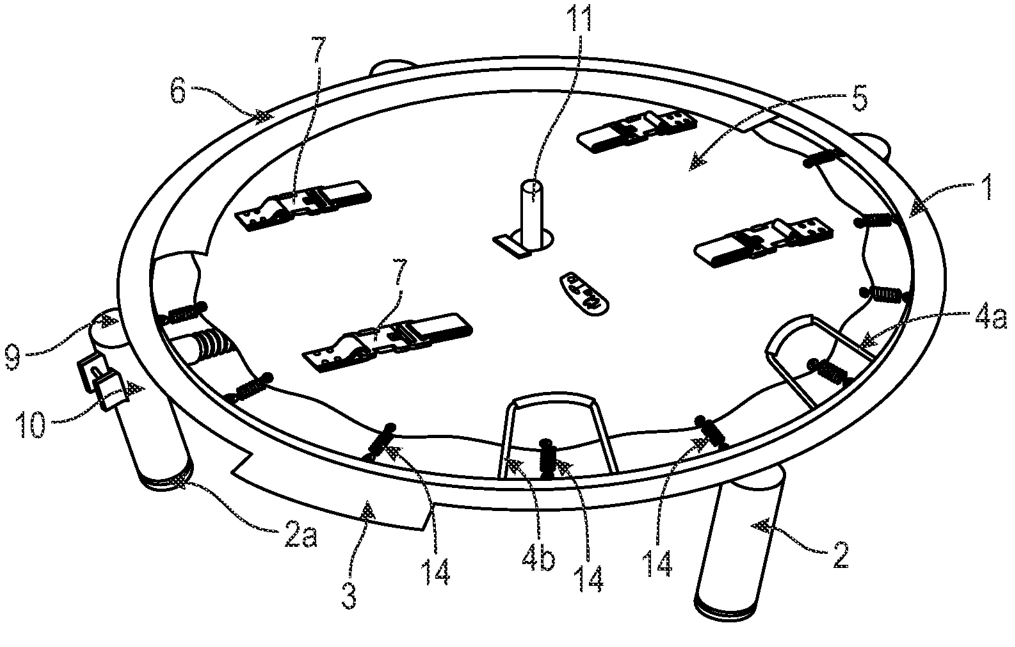
FIG. 4 shows a perspective view illustrating protective covers for a sexual rolling machine, according to an embodiment of the presently claimed invention.

As shown in FIG. 4, the main surface 5 is connected to the frame 1 by a number of springs 14. The springs 14 allow the main surface 5 to bounce when used. The springs 14 are covered by the connection cover 6 for the user's safety.

Figure 5:
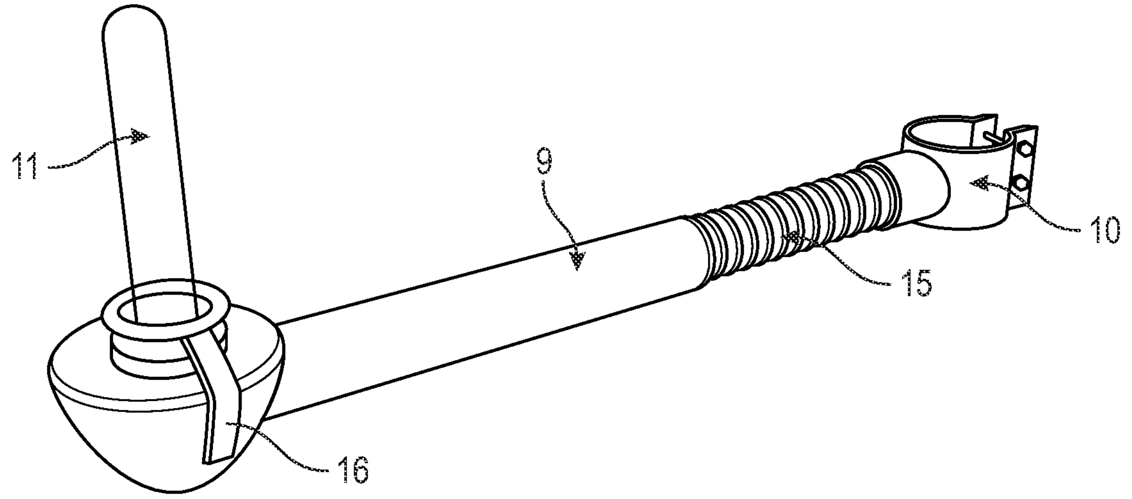
FIG. 5 shows a perspective view illustrating a toy arm for a sexual rolling machine, according to an embodiment of the presently claimed invention.
Figure 6:
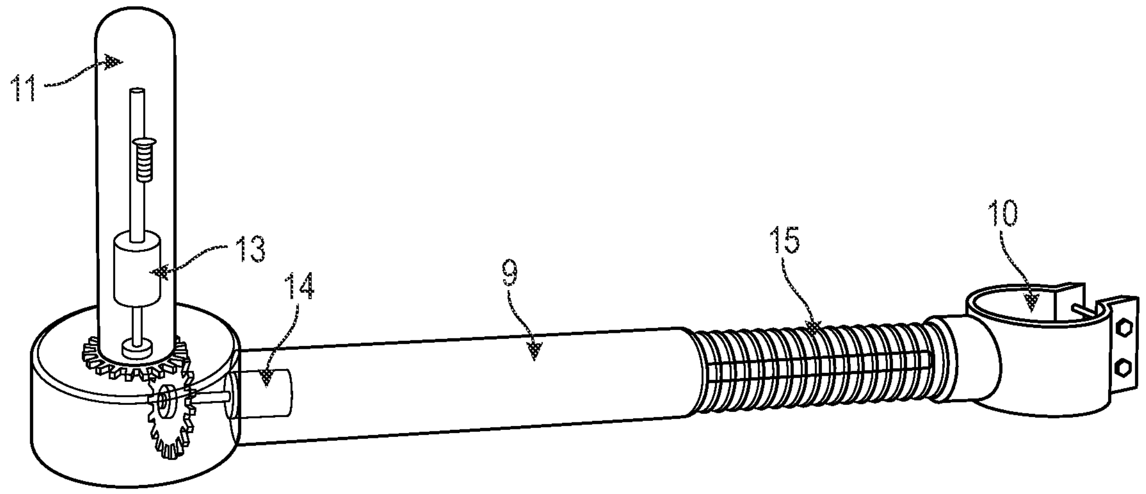
FIG. 6 shows a cut-away view illustrating the motor drive within the toy arm for a sexual rolling machine, according to an embodiment of the presently claimed invention.

As shown in FIGS. 5-6, the toy support arm 9 houses the motor drive 12, which includes a vibrating motor 13 and a rotational motor 14. The vibrator motor 13 may be any motor that creates a vibration and transfers it from the vibrator motor 13 to the toy attachment 11, such a motor with an unbalanced mass on the drive shaft. The rotational motor 14 may be any motor that creates a rotation and transfers it from the rotational motor 14 to the toy attachment 11. The vibrating motor 13 and the rotational motor 14 may be arranged in a number of ways that result in the toy attachment 11 can be controlled to both vibrate and rotate. The support arm 9 may include a flexible area 15 that helps isolate the rotational and vibrating effects of the motor drive 12 from the frame 1 so that the motor drive 12 does not cause the leg 2 that the support arm 9 is attached to via the clamp 10 to also vibrate. The toy attachment part 11 extends vertically from the support arm 9 and is further supported by a ring support 16 connected to the support arm 9 to prevent the attachment part 11 from being bent too far during use, improving durability.

Figure 7:
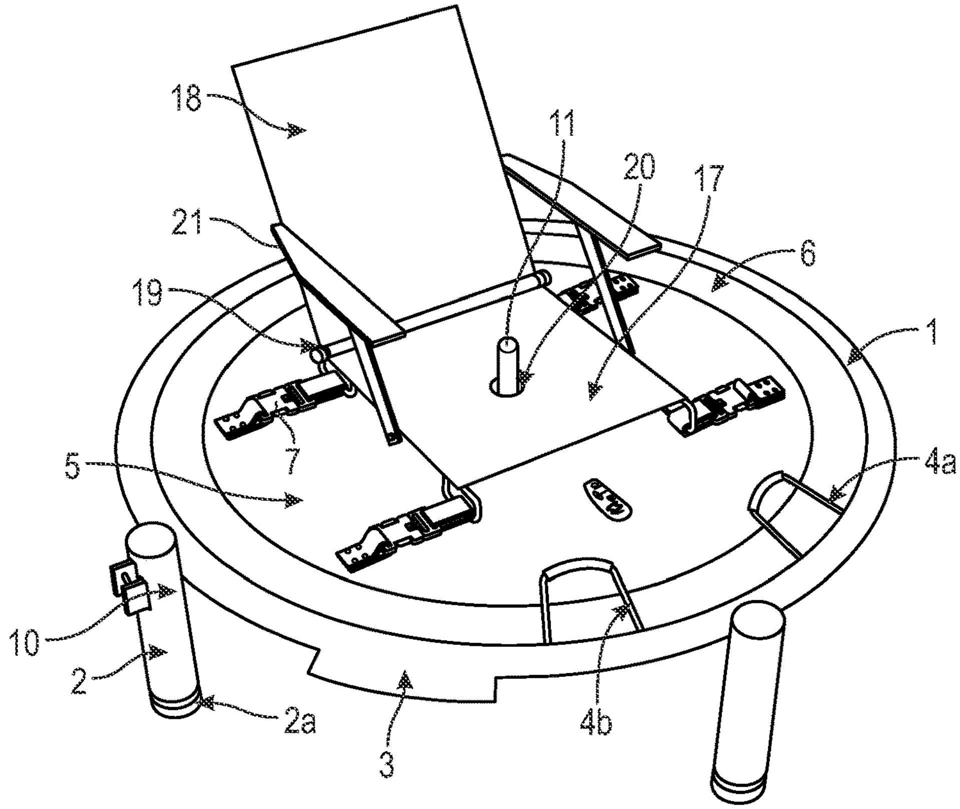
FIG. 7 shows a perspective view illustrating a removeable chair for a sexual rolling machine, according to an embodiment of the presently claimed invention.
Figure 8:
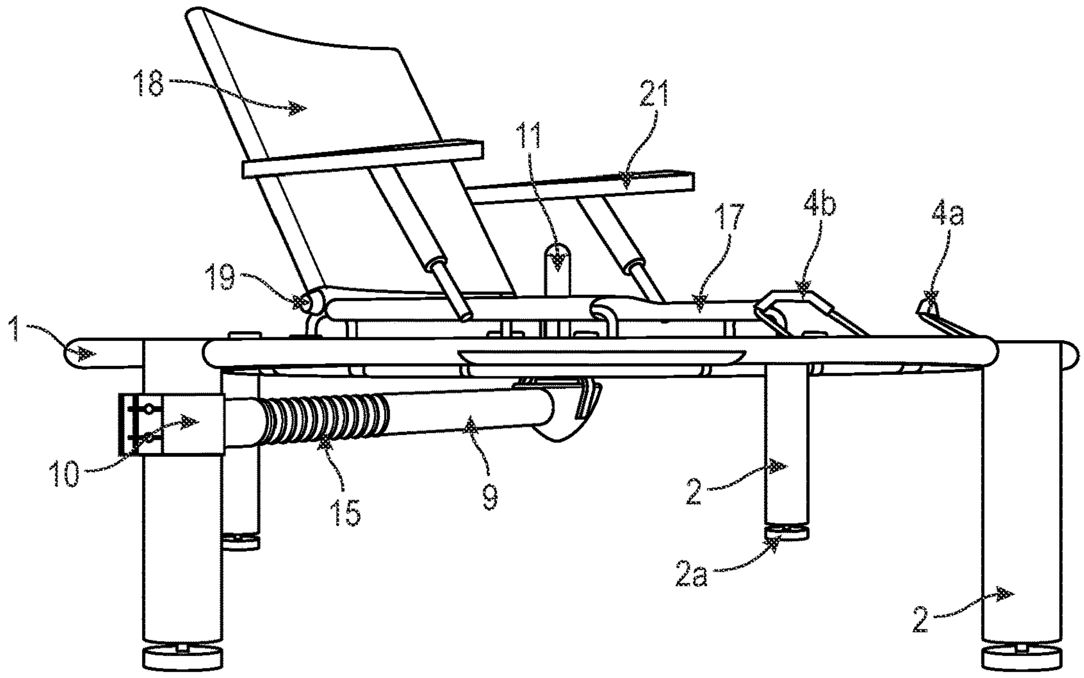
FIG. 8 shows a perspective view illustrating a sexual rolling machine with a chair attached, according to an embodiment of the presently claimed invention.

As shown in FIGS. 7-8, the sexual rolling machine includes a detachable seat 17 with an adjustable back rest 18. The detachable seat 17 is firmly but detachably connected to the main surface 5 by the one or more chair attachments 7. The chair attachments 7 may be straps with buckles attached to the main surface 5 so that the seat 17 may be buckled to the main surface 5. The adjustable back rest 18 is supported in the desired position by a strap 19 that connects the back rest 18 that attaches to the back side of the seat 17. The hinge 19 is adjustable to allow the angle between the back rest 18 and the seat 17 to be changed. The seat 17 also has a central opening 20 that goes over the toy attachment part 11 and aligns with the central opening 8 of the main surface 5 when the seat 17 is attached to the main surface 5. The seat 17 may also include arm rests 21 between the seat 17 and the back rest 18.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set fourth in the appended claim:

1. A Sexual Rolling Machine device comprising:

a. a frame having a top surface and a bottom surface;

b. four foldable legs, each having a top end and a bottom end, wherein each of the four foldable legs is operably connected to the frame at the top end by an internal hinge so that each foldable leg is foldable inwards across the bottom surface of the frame, and wherein each of the four foldable legs has an adjustable foot on the bottom end;

c. a left foot stirrup and a right foot stirrup operably connected to the frame to support a user's feet;

d. a main surface formed of a stretchable material having a top surface and a bottom surface, wherein the main surface is operably connected to the frame by a plurality of springs so that the main surface is bounceable when the sexual rolling machine device is used, and wherein the main surface has a central opening and two or more chair attachment devices operably positioned around the central opening so as to hold a detachable chair in place centered on the central opening;

e. a connection cover that is removably connected to the frame and the main surface so as to cover the plurality of springs;

f. the detachable chair having a seat portion and a backrest portion, wherein the seat portion is operably connected to the backrest portion via an adjustable hinge so that an angle between the seat portion and the backrest portion is adjustable, and wherein the seat portion has a central opening that aligns with the central opening of the main surface when the detachable chair is connected to the two or more chair attachment devices;

g. a toy support arm operably connected to one of the four foldable legs via a detachable clamp so as to extend horizontally along the bottom surface of the frame and the bottom surface of the main surface, the toy support arm having:

i. a motor drive including:

1. a vibration motor housed therein; and 2. a rotation motor housed therein;

ii. a flexible part operably connected between the toy support arm and the clamp so as to help isolate vibrations from the vibration motor and the rotation motor from the frame;

iii. a toy attachment part operably connected to the toy support arm to extend vertically upwards through the central opening of the main surface and the central opening of the detachable chair, wherein the toy attachment part is attachable to one or more erotic devices; and iv. a ring support portion operably connected to the support arm and surrounding the toy attachment part; and h. a control device operably connected to the motor drive so as to control an on-off function of the vibration motor and the rotation motor, a speed of the vibration motor, a direction of the rotation motor, and a speed of the rotation motor, wherein the control device is operably positioned on the top surface of the main surface in a location easily reachable by the user during use of the sexual rolling machine device.

2. The sexual rolling machine according to claim 1, wherein the frame has an integral handle.

3. The sexual rolling machine according to claim 1, wherein the detachable chair includes a left armrest operably connected to a left side of the backrest portion and a left side of the seat portion and a right armrest operably connected to a right side of the backrest portion and a right sight of the seat portion so as to support a user's arms.

4. The sexual rolling machine according to claim 1, wherein the control device is a remote control device.

5. The sexual rolling machine according to claim 1, wherein the control device is a detachable remote control device.

6. Sexual Rolling Machine device comprising:

a. a frame having a top surface and a bottom surface, wherein the frame has an integral handle;

b. four foldable legs, each having a top end and a bottom end, wherein each of the four foldable legs is operably connected to the frame at the top end by an internal hinge so that each foldable leg is foldable inwards across the bottom surface of the frame, and wherein each of the four foldable legs has an adjustable foot on the bottom end;

c. a left foot stirrup and a right foot stirrup operably connected to the frame to support a user's feet;

d. a main surface formed of a stretchable material having a top surface and a bottom surface, wherein the main surface is operably connected to the frame by a plurality of springs so that the main surface is bounceable when the sexual rolling machine device is used, and wherein the main surface has a central opening and two or more chair attachment devices operably positioned around the central opening so as to hold a detachable chair in place centered on the central opening;

e. a connection cover that is removably connected to the frame and the main surface so as to cover the plurality of springs;

f. the detachable chair having a seat portion and a backrest portion, wherein the seat portion is operably connected to the backrest portion via an adjustable hinge so that an angle between the seat portion and the backrest portion is adjustable, and wherein the seat portion has a central opening that aligns with the central opening of the main surface when the detachable chair is connected to the two or more chair attachment devices, wherein the detachable chair includes a left armrest operably connected to a left side of the backrest portion and a left side of the seat portion and a right armrest operably connected to a right side of the backrest portion and a right sight of the seat portion so as to support a user's arms;

g. a toy support arm operably connected to one of the four foldable legs via a detachable clamp so as to extend horizontally along the bottom surface of the frame and the bottom surface of the main surface, the toy support arm having i. a motor drive including:

1. a vibration motor housed therein; and

2. a rotation motor housed therein;

ii. a flexible part operably connected between the toy support arm and the clamp so as to help isolate vibrations from the vibration motor and the rotation motor from the frame;

iii. a toy attachment part operably connected to the toy support arm to extend vertically upwards through the central opening of the main surface and the central opening of the detachable chair, wherein the toy attachment part is attachable to one or more erotic devices; and iv. a ring support portion operably connected to the support arm and surrounding the toy attachment part so as to prevent the toy attachment part from being excessively bent during use; and h. a remote control device operably connected to the motor drive so as to control an on-off function of the vibration motor and the rotation motor, a speed of the vibration motor, a direction of the rotation motor, and a speed of the rotation motor, wherein the control device is operably positioned on the top surface of the main surface in a location easily reachable by the user during use of the sexual rolling machine device.

7. The sexual rolling machine according to claim 6, wherein the control device is a detachable remote control device.

* * * * *